United States Patent [19]
Becker et al.

[11] Patent Number: 5,482,538
[45] Date of Patent: Jan. 9, 1996

[54] PROCESS FOR REMOVING UNDESIRABLE CONSTITUENTS FROM A GAS

[75] Inventors: Oliver Becker, Losheim; Sabine Kolz, Grossrosseln; Herbert Hager, Nalbach, all of Germany

[73] Assignee: Mannesmann Aktiengesellschaft, Dusseldorf, Germany

[21] Appl. No.: 267,115

[22] Filed: Jun. 24, 1994

[30] Foreign Application Priority Data

Jun. 24, 1993 [DE] Germany ............... 43 21 622.6
Jun. 7, 1994 [DE] Germany ............... 44 20 224.5

[51] Int. Cl.⁶ ................................ B01D 35/18
[52] U.S. Cl. ........................ 95/12; 05/18; 05/120; 05/143; 05/148; 05/283
[58] Field of Search .............. 95/14, 16–18, 95/120, 123, 125, 126, 143, 148, 283, 8, 12; 96/112, 121–133, 143, 146; 55/267–269, DIG. 10.

[56] References Cited

U.S. PATENT DOCUMENTS

| | | | |
|---|---|---|---|
| 3,408,794 | 11/1968 | Stoddard | 55/DIG. 10 |
| 3,844,737 | 10/1974 | Macriss et al. | 95/123 X |
| 4,012,206 | 3/1977 | Macriss et aL. | 95/125 X |
| 4,038,050 | 7/1977 | Lowther | 95/126 X |
| 4,134,743 | 1/1979 | Macriss et al. | 95/125 X |
| 4,348,362 | 9/1982 | Foss | 55/DIG. 10 |
| 4,404,795 | 9/1983 | Oishi et al. | 55/DIG. 10 |
| 4,427,418 | 1/1984 | Kogiso et al. | 55/DIG. 10 |
| 4,450,682 | 5/1984 | Sato et al. | 55/DIG. 10 |
| 4,485,622 | 12/1984 | Takagi et al. | 55/DIG. 10 |
| 4,523,935 | 6/1985 | Takagi et al. | 55/DIG. 10 |
| 4,548,625 | 10/1985 | Ishida et al. | 55/DIG. 10 |
| 4,549,398 | 10/1985 | Oishi et al. | 55/DIG. 10 |
| 5,248,481 | 9/1993 | Bloom et al. | 55/DIG. 10 |

FOREIGN PATENT DOCUMENTS 3021174 12/1980 Germany.
3804722 8/1989 Germany.
3929521 3/1991 Germany.

*Primary Examiner*—Robert Spitzer
*Attorney, Agent, or Firm*—Cohen, Pontani, Lieberman, Pavane

[57] ABSTRACT

A process for removing undesirable constituents from a gas, including providing an immovable, non-combustible woven adsorbate element, passing a flow of the gas through the element so that the gas is sharply deflected in the element and so that the constituents are adsorptively added to the element, interrupting the gas flow when the element reaches a maximum load of adsorbed constituents, directly heating the element while the gas flow is interrupted, by applying an electric voltage, to a process temperature of at 200° C. for removing the adsorbed constituents at the adsorption point, intermittently supplying a gas flow after the process temperature is reached at intervals that ensure that the temperature of an inlet side of the adsorption element does not drop below the process temperature and the temperature of an outlet side of the adsorption element does not exceed a pre-defined maximum value, and discontinuing the heating so that the element cools to an operating temperature at which adsorption occurs.

14 Claims, 2 Drawing Sheets

PROCESS FOR REMOVING UNDESIRABLE CONSTITUENTS FROM A GAS

BACKGROUND OF THE INVENTION

1. Field of the Invention

The invention relates to a process for removing undesirable constituents from a gas by heterogeneous catalysis.

2. Description of the Prior Art

The catalytic combustion of carrier-fixed contaminants is known in principle and can be carried out using a wide variety of catalysts, as is disclosed in DE A 38 04 722. The disadvantage of the previously known catalytic processes lies in the fact that all of the carrier air must be heated to the working temperature of the catalytic material (200 to 600 degrees Celsius). During combustion processes, e.g., in vehicle engines, the exhaust gas to be purified is itself already at the required process temperature. In the former case, in which the required energy must be supplied from the outside, this entails high energy expenditure and limits the application area of catalytic post-combustion.

To overcome this problem, it has already been suggested, for example in DE A 3929521 that only the catalytic surface be brought to the required working temperature, so that a carrier air of approximately room temperature can be worked with. For this, a heating wire coated with a catalytic material is used that is directly heated through the application of an electric voltage. The carrier-fixed contaminated air is then conducted, for example, through a tight screen of catalytic wires mounted to a frame made of an electrically insulating material, so quickly that the air heats up slightly and the contaminants are largely broken down by catalytic oxidation. A disadvantage of this process is the poor efficiency of the unit, since every air molecule must be brought into direct contact with the coated heating wires. This is not practically possible at the throughput of contaminated exhaust air required for the performance of the unit. The process described does not work in the case of exhaust air with a low concentration of contaminants, especially when the level falls below 100 mg/m$^3$ of exhaust air.

Along with the process of direct catalytic combustion, the process of prior adsorption of contaminants from carrier-fixed exhaust air by means of an adsorbate is known from DE A 30 21 174. In this generic process, the gas to be purified is conducted at a temperature of between 0° and 250° C. by means of pressure through a bed of a particulate adsorber that consists of a porous ceramic carrier with a large specific inner surface and is impregnated with a material active at elevated temperature as an oxidation catalyst. First the gaseous constituents are adsorbed and, no later than after the bed is loaded with the maximum load capacity theoretically possible, the bed is heated to a process temperature between 250 and 350° C. and the process temperature is maintained over a set time interval and, after the process temperature is reached, the constituents are catalytically combusted at the adsorption site. After the heating is terminated and the bed cools to the operating temperature, adsorptive addition resumes. The heating of the bed occurs by virtue of a burner being located in the feed pipe to the reaction chamber. This burner is ignited when the adsorbent is to be regenerated. A disadvantage in this procedure is the indirect heating of the adsorber by the heated gas to be purified, since heat transmission from a gas to a solid is poor. As a result, the solid reaches the required process temperature very slowly, and catalytic combustion does not take place or takes place only incompletely during this heating phase. Because of this, post-purification is necessary to surmount this phase of incomplete combustion. However, the installation of post-purification equipment entails a considerable financial expenditure and also means that energy will be lost. Another disadvantage of the suggested process is the fact that temperatures of more than 800° C. can be reached in the adsorbent during regeneration. At these high temperatures, the danger exists that the carrier material will bake through sintering or that the catalytic effect will be destroyed.

SUMMARY OF THE INVENTION

Accordingly, it is an object of the present invention to provide a reliable process for removing the undesirable constituents of a gas as well as for, in particular, neutralizing odors, with which process it is possible to remove these undesirable constituents efficiently, with low energy demand and without post-purification, in a regenerable fashion and without removing the filter element, even during fluctuating contaminant concentrations of less than 100 mg/m$^3$.

Pursuant to this object, and others which will become apparent hereafter, one aspect of the present invention resides in a process for removing undesirable constituents of a gas through heterogeneous catalysis, wherein the gas, at a temperature between room temperature and less than 200° C. is conducted by pressure or suction past an immovable, non-combustible element which can be heated to a process temperature and is designed as an adsorbate. The adsorbate element can also be provided with a finely distributed catalytic material. The element is designed as a weave and the gas is sharply deflected therein. After the maximum load of the element is reached, it is heated directly, by the application of an electric voltage to a heating element integrated in the weave element, to a process temperature of at least 200° C. while the supply of the gas to be purified is interrupted. After the process temperature is reached, a gas is intermittently supplied as an oxygen carrier with a minimum content of 12% $O_2$ by volume at a supply interval selected so that the temperature of the inlet side of the adsorption element is not dropped below the process temperature and the temperature of the outlet side of the adsorption element does not exceed a set maximum value.

In a further embodiment of the invention the adsorption element is heated to a process temperature of at least 400° C. while the supply of gas to be purified is interrupted. After the process temperature is reached the gas to be purified is supplied intermittently at intervals selected so that the temperature of the inlet side of the adsorption element does not drop below the process temperature and the temperature of the outlet side of the adsorption element does not exceed a set maximum value.

In yet another embodiment of the invention the concentration of the constituents and the accumulated quantity of the gas to be purified are measured continuously and compared to the loading capacity of the element. This ratio is used to generate a control signal, taking into account a set margin of safety, for activating the heating of the adsorption element.

In still a further embodiment the heating of the adsorption element is controlled by using a change in the electrical resistance of the heating element.

Yet another embodiment of the invention utilizes 600° C. as the maximum temperature on the outlet side of the adsorption element.

It is already known that it is useful in the case of gaseous mixtures with a low concentration of contaminants (on the order of less than 100 mg/m³ of carrier gas) for the undesirable gaseous constituents to first be concentrated before they subsequently undergo catalytic combustion or cracking effectively and with low energy expenditure. This procedure has the advantage of permitting effective odor neutralization, particularly for annoying odors, such as those arising from confinement farming stables, the exhaust air of luxury food factories such as coffee roasting plants and chocolate factories, fast-food establishments, etc., when the concentration of undesirable contaminants lies under 10 mb/m³.

The desired odor neutralization is achieved by concentrating the undesirable constituents in a known manner, i.e., adsorptively added and desorbed through heating and subsequently catalytically combusted or cracked. Adsorptive addition, however, depending on the concentration of the constituents in the gas to be purified and on the throughput quantity, is only possible for a certain period of time, since at some point the maximum theoretical load capacity of the filter element will be reached. If gas loaded with the constituents continues to be fed beyond this point to the already loaded filter element, no more adsorptive addition occurs and the desired purification and/or odor neutralization does not take place. The filter element constructed according to the invention as a weave is regenerated, at the latest, when the load capacity is reached. Regeneration takes place through the direct heating of the filter element by a heating element integrated into the filter element, which heats the filter element to the required process temperature of at least 200° C. by the application of an electric voltage. During this heating, the further supply of gas to be purified is interrupted. Instead of using an integrated heating element, there is also the option of designing the filter element so that it is itself electrically conductive.

Depending on the composition of the constituents, the temperature lies in a range between 200 and a maximum of 700 degrees Celsius. In the case of elimination through heterogeneous catalysis, the temperature range is between 200 and 400 degrees Celsius. For the alternative of cracking, the filter element must be heated to approximately 400–600 degrees Celsius. The latter process can be advantageously used when the constituents consist primarily of long-chain hydrocarbons. Such hydrocarbons become unstable at high temperatures, and parts of the molecular chains break off, so that annoying odors vanish. The filter element needed for this has an especially simple design, since no coating or impregnation with catalytic material, e.g. platinum, is required. The advantage over the known prior art lies in the fact that the filter element is heated through thermal conduction, which is more effective and faster than the gas-solid system. Through the interruption of the gas supply according to the invention, the filter element reaches the required process temperature in a very short time.

Also helpful in this respect is the fact that the filter element is not designed as a massive solid with a large mass, but rather as a weave of glass fibers. Using a woven form as the carrier for the adsorption material and the catalytic material also ensures that the gas conducted through the element is sharply deflected, so that the adsorptive and catalytic effect is particularly intense. Through the heating of the element, the molecular linkage forces which attach the contaminant molecule to the adsorbate are overcome, and the contaminant molecule is desorbed. During the continued blocking of the gas supply, the contaminant molecule remains in the filter element. It is essential to the process according to the invention that the gas flow needed for the regeneration of the filter element not be turned on until the filter element has reached the required process temperature.

So that the desired catalytic combustion occurs completely, the gas supplied after the process temperature is reached should have a minimum oxygen content of 12% by volume. In many cases, this condition is met by the gas to be purified itself; in special cases, it may be necessary to add fresh air, while in an extreme case fresh air alone may be required. So that the filter element against which the gas flows maintains the process temperature during the regeneration phase and, at the same time, does not become overheated, the supply of gas is intermittent. The supply interval is selected so that, first of all, the temperature of the entry side of the filter element does not fall below the process temperature and, secondly, the temperature of the exit side of the element does not exceed a set maximum value, for example, 600° C. Here it is important that most of the catalytic combustion which occurs takes place exothermally and that the filter element is heated above the minimum temperature. The suggested process ensures, first, that the minimum temperature for proper catalytic combustion is maintained for every area of the filter element and second, that overheating does not occur on the hotter exit side, which could severely impact the effectiveness of the filter element, or, in the worst case, even destroy it.

The supplied oxygenic gas must ensure an appropriate oxygen supply in the area of the catalytic combustion in progress and must also expel the reaction products from the filter element. As soon as all of the detached contaminant molecules are burned, the heating of the element can be turned off again and the element can cool down. The degree of cooling depends on the operating temperature at which the filter element is run. In most cases, the operating temperature will be the same as room temperature, since many of the application cases lie in this temperature range. However, the adsorbate can also be designed so that adsorptive addition is also possible at higher temperatures, i.e., up to a maximum of approximately 200 degrees Celsius. The heating necessary for desorption of the adsorbed constituents is then slight, as is the cooling. In contrast to the known prior art, an advantage in direct heating is that adsorptive addition resumes on the much faster-cooling entry side of the filter element, while catalytic combustion continues to occur on the exit side.

The point in time at which the load capacity of the element is reached can be determined in a number of ways. One option is to continuously measure the concentration of the constituents and the quantity of gas accumulating for purification, and to compare these to the load capacity previously determined experimentally or by computation. Allowing for a set margin of safety, a control signal for activating the heating of the element is generated from this ratio. After the expiration of a set burn period, the heating is turned off again. In the case of contaminant accumulation with relatively constant values in respect to quantity and concentration, the loading period can also be determined by computation, and the heating can be regulated in a timed fashion.

For effective catalytic oxidation, it is necessary that the element be heated by the heating process to a process temperature appropriate to the contaminant type. In order to precisely record this temperature, it is further suggested that the change in the electrical resistance of the heated filter element be used to control the heating. This makes it unnecessary to attach a temperature sensor to the filter element, which can be difficult to do, or to conduct a cable from the sensor to the measurement instrument or control unit.

In the type of regeneration according to the invention described above, no loading of the element can occur during the regeneration phase. In a number of application cases, this is not acceptable, since often there is no way to temporarily store the contaminated mixture of substances that accumulates. In such cases, it is desirable to connect two elements parallel to one another, one of which is loaded while the other is regenerated. The advantage of this arrangement is that during continuous processes with the constant accumulation of contaminated mixtures, uninterrupted loading is ensured by means of a changeover, whereby individual elements can be combined into larger units by serial or parallel connection.

In addition to neutralizing odors from large-scale kitchens, high density animal farming, the production of foodstuffs and luxury foods, and the pharmaceutical industry, this technique can be used to remove basic known organic substances. Given this broad application spectrum, the possibility that the exhaust air to be purified will also be contaminated with solid particles must be anticipated. Furthermore, the gas to be purified may contain components that form ash particles during catalytic combustion. Such components must be removed in advance, so that the element does not become dirty or clogged after a short period of operation. It is therefore suggested in such cases that an appropriate separator be pre-connected to the element. Separators for solid particles and for components that result in ash particles are well known, so that no further explanation of them is necessary. In respect to an excessive share of steam, it is possible to pre-connect a known aerosol separator in front of the filter element. In the event that greasy droplets accumulate, special pre-purification measures must be taken.

The inventive process can also be used for selective adsorption. In this case, individual materials can be separated from a mixture of substances through a defined pore size of the element. The generally small pore size also allows the adsorption not only of large-molecule hydrocarbons, but also of small molecules, such as, for example, CO. Along with the known catalytic material of platinum-palladium, other metals or metal oxides can also be used, so that the process is also applicable for reduction. For use in air drying or gas drying, no catalytic material is required, since all that matters here is adsorptive addition.

The process according to the invention has the advantage that the filter element used in it can be kept small in size, since the adsorption site of the contaminant molecules and the combustion site during the subsequent catalytic oxidation (or the cracking site) are located at the same place. The process also allows the regeneration of the filter element to be repeated as often as desired, so that it is not necessary to install or remove the filter element within its longterm useful life. Since the heating of the element is controlled in dependence on the load status of the element, interruptions of the work process, during which no gas with undesirable constituents accumulates, can be used as a way of saving energy. In addition, the filter element is to be designed in such a way that the regeneration phase amounts to only a fraction of the loading time.

The invention is not limited by the embodiments described above which are presented as examples only but can be modified in various ways within the scope of protection defined by the appended patent claims.

DETAILED DESCRIPTION OF THE PREFERRED EMBODIMENTS

The inventive process will be explained in greater detail by way of an example.

Residents living near sewage treatment plants find the odors arising in the plants and carried by the wind into residential areas unpleasant and annoying. Essentially, what are involved here are organic decomposition products which smell particularly of fecal matter and hydrogen sulphide. The neutralization of such foul-smelling gases has been selected as the application for describing the process according to the present invention.

The gas contaminated with undesirable gaseous constituents, referred to here as the "raw gas," is conducted by means of a ventilator through a channel to a module, which is designed as a permanent element and is provided with an active catalytic material. After the raw gas flows through the module, the outgoing purified gas is odor-neutral and the concentration of undesirable constituents is lowered to less than 1 ppm, measured as total carbon content. As soon as the module has reached its maximum theoretical loading capacity, the supply of gas is interrupted and the module is directly heated to, for example, 350° C. As soon as the preset temperature is reached, the gas inlet is opened, whereby it is ensured that this gas has a minimum $O_2$ content of 12% by volume. Otherwise, fresh air must be mixed in.

The catalytic combustion of the hydrocarbons previously adsorbed and, with increasing heat, desorbed begins at approximately 250° C. After a certain time, the module is regenerated and all adsorbed contaminant molecules are eliminated from the module. After the heating is turned off and cooling takes place to a temperature below approximately 200° C., the adsorptive loading of the module can resume. Usually, regeneration occurs in three stages. In the first stage, the further supply of raw gas is cut off and no further loading takes place. At the same time, the heating is switched on and the module is heated to, for example, 350° C. After the preset final temperature is reached, the gas inlet is reopened and, during intermittent volume flow, catalytic combustion and the elimination of reaction products occur. These products consist essentially of $CO_2$ and steam. In the third and final phase, the heating is switched off and, after the module cools to below 200° C., loading can resume.

Figure 1:
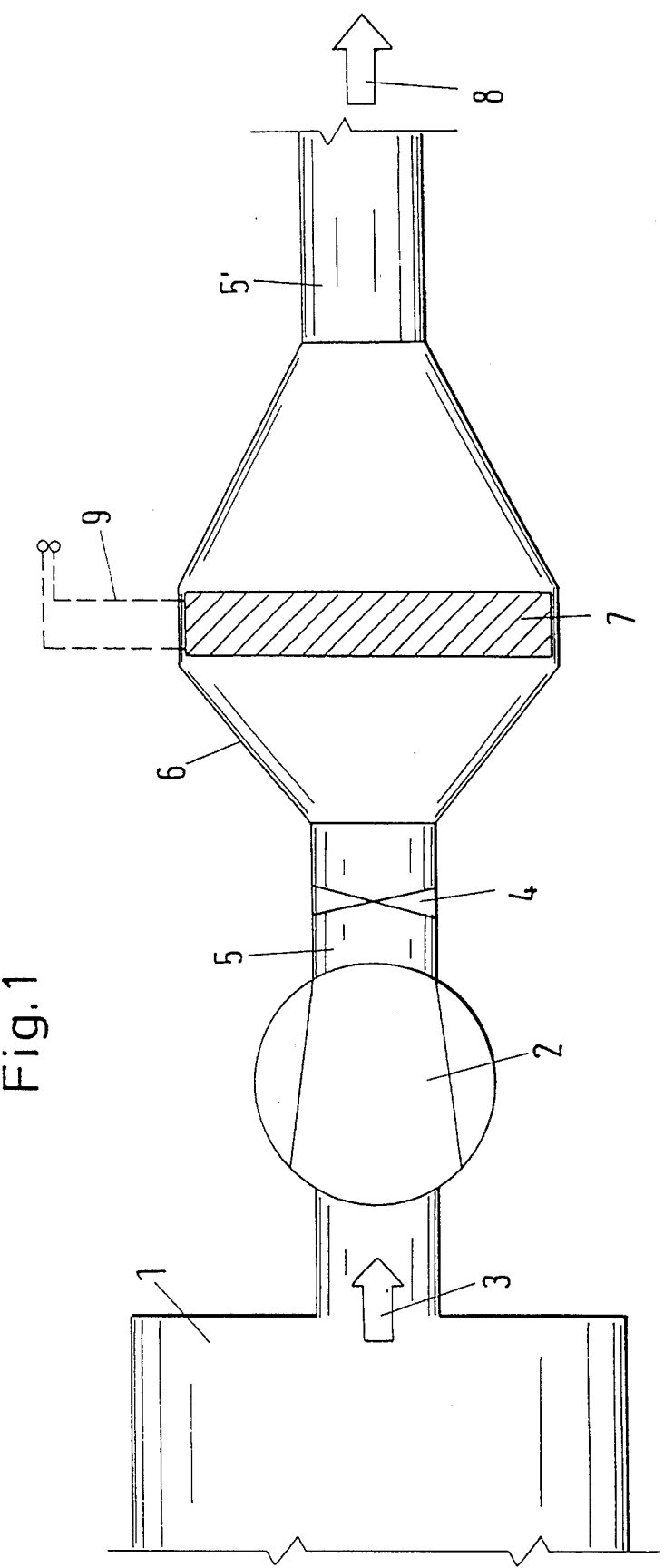
FIG. 1 schematically illustrates the inventive process.

FIG. 1 schematically depicts a unit according to the invention in longitudinal section. The gas 3 containing undesirable constituents, referred to here as the raw gas, is drawn out by means of a ventilator 2 from a container or space 1. The volumetric flow can be regulated by means of a damper 4 connected behind the ventilator 2. Between a supply channel 5 and an extraction channel 5' a housing 6 is connected which has a diameter larger than that of the channels 5, 5'. The module 7 is located in the housing 6. This module 7 is an immovable element, having a large specific surface, that is impregnated with an active catalytic material, for example, platinum. After flowing through the module 7, the raw gas 3 is freed of its undesirable constituents and can exit the extraction channel 5' as purified gas 8. The module 7 can be directly heated, as indicated here by the electrical connections 9 shown as dashed lines.

The size of the module 7 depends on the design data of the unit as a whole and is essentially dependent on the desired throughput. For example, if the module 7 has a diameter of 300 mm and a height of 50 mm while weighing a total of 4 kg, the throughput for such a module 7 lies in a range between 80 and 90 cbm per hour. When gas is flowing through the module 7, a pressure loss in the magnitude of 500 pascals occurs. An electrical connection of 1.5 kW is provided for the heating of module 7. The damper 4 can be adjusted at any time from a "closed" into an "open" position.

In the data specified here by way of example, the first phase for heating the module at approximately 350° C. lasts roughly five minutes. The catalytic combustion of the previously adsorbed contaminant molecules lasts approximately 30 minutes. The third and final phase, after the heating is turned off, also lasts on the order of five minutes, so that the total time for the regeneration of module 7 is about 40 minutes. In contrast to this, the loading time lasts more than 150 hours, although this is heavily dependent on the concentration of undesirable constituents in the raw gas. If the duration of the regeneration phase is compared to the loading time, a value of less than 1 percent is arrived at. This means that, in contrast to the known prior art, in which catalytic combustion takes place continually, the electrical heating is only used for a short time. The energy expenditure needed for this is insignificantly small compared to that of the ventilator.

This example makes clear the advantage of the process according to the invention, during which, particularly in the case of a very low concentration of contaminants, adsorptive loading occurs over a long period of time and the loaded module can be regenerated again in a comparatively short time. Also, electrical power, the consumption of which during regeneration of the module is insignificantly low compared to the power consumed by the ventilator, and is needed only during the regeneration phase.

Figure 2:
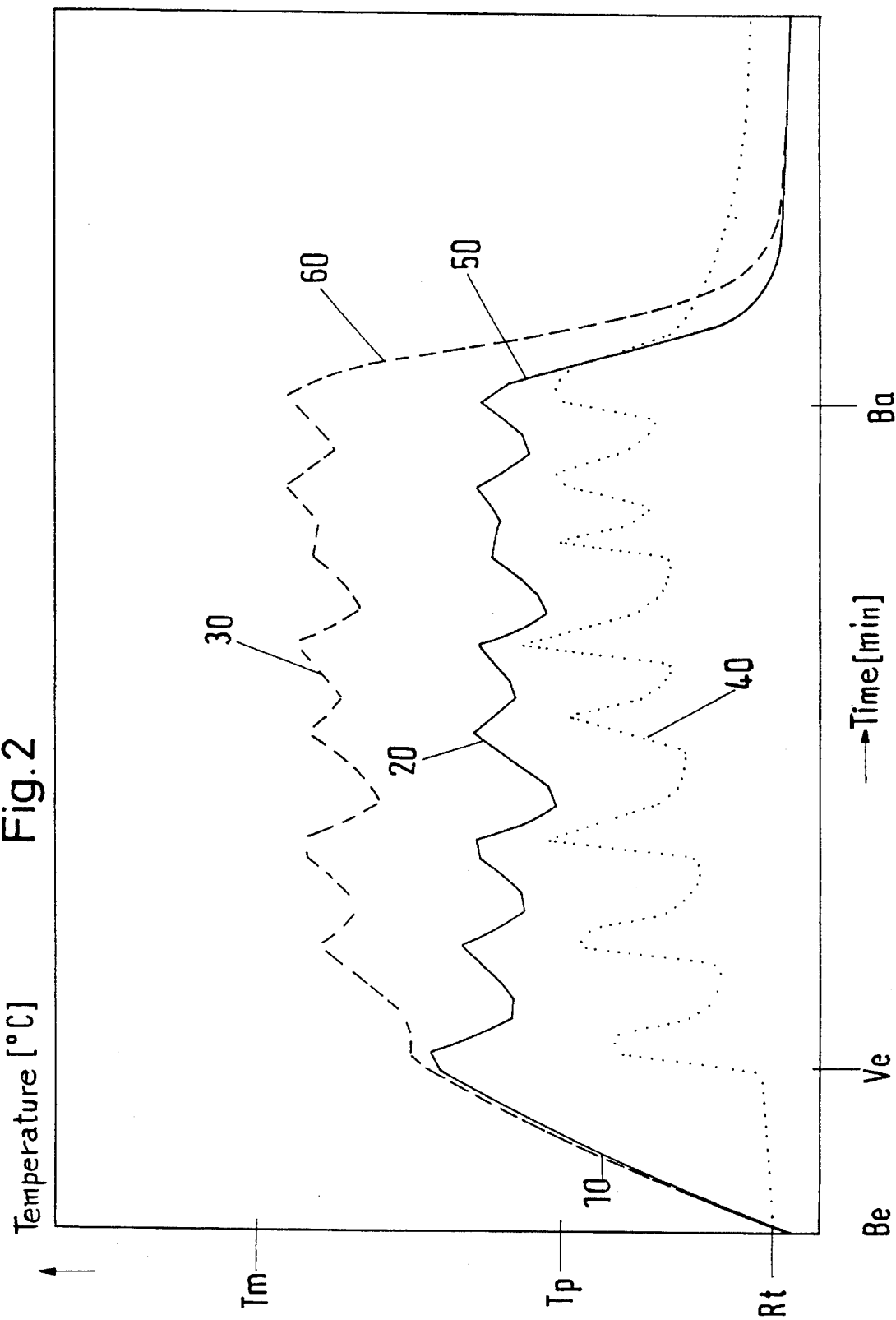
FIG. 2 shows how the gas functions during regeneration.

FIG. 2 is a schematic depiction of the manner in which the intermittent supply of gas functions during the regeneration phase. The temperature in degrees Celsius is shown on the ordinate, the time in minutes on the abscissa. $R_e$ indicates where the filter element has just reached loading capacity and regeneration is about to take place. For this purpose, with the gas inlet closed, the heating is switched on, marked here as $B_e$. The continuous line 10 shows clearly how the temperature of the filter element quickly rises after the heating is switched on. As soon as the element has reached the set process temperature ($T_p$), for example, 250° C., the ventilator is switched on and the oxygenic gas is fed in, in order to initiate catalytic combustion. The point at which the ventilator is switched on is indicated by $V_e$. The intermittent supply of gas can also occur while the ventilator continues to run and the damper 4 in the supply channel (FIG. 1) is accordingly closed and opened to a greater or lesser extent.

Starting at the point in time when the supply of gas resumes, there is a temperature difference between the inlet side 20 and the outlet side 30 of the filter element 7. In the area of heating, all areas of the filter element at first lie together in terms of temperature (see Reference Symbol 10). The dotted zig-zag lines 40 schematically reflect the intermittent course of the gas supply. It can clearly be seen how the temperature on the inlet side 20 drops somewhat during full gas flow, but still remains above the process temperature $T_p$. As soon as the supply of gas is shut off, the temperature rises again on the inlet side, with the overall trend in this example being that of a slight decline. In contrast, the outlet side 30 of the filter element initially heats up further, independent of the gas supply, and then reaches a value lying with a margin of safety below the set maximum value, indicated here by $T_m$. This ensures that the filter element does not overheat during the regeneration phase, even at the most unfavorable point. Once the peak is reached, the temperature curve on the outlet side 30 also shows the effect of the intermittent gas supply 40, though to a lesser extent. After a set time interval, which is designed so that regeneration is complete, the heating is turned on again, here indicated by $B_a$ on the abscissa. The course of the temperature curve on the inlet side 20 makes it apparent that as a result of the strong effect of the gas supply this side quickly cools 50, so that adsorptive addition can resume in this area. In time-shifted fashion, cooling 60 also occurs on the outlet side, ensuring that catalytic combustion continues to occur in this area. As soon as this area falls noticeably below the process temperature line $T_p$, adsorptive addition also resumes here.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

We claim:

1. A process for removing undesirable constituents from a gas, comprising the steps of:

providing an immovable, non-combustible woven adsorbate element;

passing a flow of the gas through the element so that the gas is sharply deflected in the element and so that the constituents are adsorptively added to the element;

interrupting the gas flow when the element reaches a maximum load of adsorbed constituents;

directly heating the element while the gas flow is interrupted, by applying an electric voltage, to a process temperature of at least 200° C. for removing the adsorbed constituents from where they are adsorbed to the adsorbate element;

intermittently supplying a gas flow after the process temperature is reached at intervals that ensure that the temperature of an inlet side of the adsorbate element does not drop below the process temperature and the temperature of an outlet side of the adsorbate element does not exceed a pre-defined maximum value; and discontinuing the heating so that the element cools to an operating temperature at which adsorption occurs.

2. A process for removing undesirable constituents from a gas by heterogeneous catalysis, comprising the steps of:

providing an immovable, non-combustible woven adsorbate element having a finely distributed catalytic material;

passing a flow of the gas at a temperature of less than 200° C. through the element so that the gas is sharply deflected in the element and so that the constituents are adsorbed by the adsorbate element;

interrupting the gas flow when the adsorbate element reaches a maximum load of adsorbed constituents;

directly heating the element while the gas flow is interrupted, by applying an electric voltage, to a process temperature of at least 200° C. for catalytically combusting the constituents where they are adsorbed by the adsorbate element;

intermittently supplying a gas as an oxygen carrier with a minimum content of 12% $O_2$ by volume after the process temperature is reached, the gas being supplied at intervals having a duration such that the temperature of an inlet side of the adsorbate element does not drop below the process temperature and the temperature of an outlet side of the adsorbate element does not exceed a pre-defined maximum value; and discontinuing the heating so that the element cools to an operating temperature at which adsorption occurs.

3. A process as defined in claim 2, wherein the step of passing the gas includes passing the gas through the element at room temperature.

4. A process as defined in claim 2, including continuously measuring a concentration of the constituents and an accumulated quantity of the gas to be purified, comparing the measured constituent concentration and the accumulated quantity of gas to a loading capacity of the element to determine a ratio, and generating a control signal from this ratio for activating the heating step, taking into account a set margin of safety.

5. A process as defined in claim 2, wherein the heating step includes heating the adsorbate element with a heating element integrated in the adsorbate element.

6. A process as defined in claim 5, including controlling the heating step by using a change in electrical resistance of the heating element as a measurement signal.

7. A process as defined in claim 2, wherein the maximum predefined temperature value on the outlet side of the adsorbate element is under 600° C.

8. A process as defined in claim 2, and further comprising the step of eliminating solid particles and liquid and grease droplets from the gas before the gas enters the adsorbate element.

9. A process for removing undesirable constituents from a gas, comprising the steps of:

providing an immovable, non-combustible woven adsorbate element;

passing a flow of the gas through the element so that the gas is sharply deflected in the element and so that the constituents are adsorptively added to the element;

interrupting the gas flow when the element reaches a maximum load of adsorbed constituents;

directly heating the element while the gas flow is interrupted, by applying an electric voltage, to a process temperature of at least 400° C. for cracking the constituents where they are adsorbed to the adsorbate element;

intermittently supplying the gas flow after the process temperature is reached at intervals of a duration such that the temperature of an inlet side of the adsorbate element does not drop below the process temperature and the temperature of an outlet side of the adsorbate element does not exceed a predefined maximum value; and discontinuing the heating so that the element cools to an operating temperature at which adsorption occurs.

10. A process as defined in claim 9, including continuously measuring a concentration of the constituents and an accumulated quantity of the gas to be purified, comparing the measured constituent concentration and the accumulated quantity of gas to a loading capacity of the element to determine a ratio, and generating a control signal from this ratio for activating the heating step, taking into account a set margin of safety.

11. A process as defined in claim 9, wherein the heating step includes heating the adsorbate element with a heating element integrated in the adsorbate element.

12. A process as defined in claim 11, including controlling the heating step by using a change in electrical resistance of the heating element as a measurement signal.

13. A process as defined in claim 9, wherein the maximum predefined temperature value on the outlet side of the adsorbate element is under 600° C.

14. A process as defined in claim 9, and further comprising the step of eliminating solid particles and liquid and grease droplets from the gas before the gas enters the adsorbate element.

* * * * *